Feb. 2, 1960
J. F. YONASH
2,923,409
GRAIN SAVER SIEVE FOR COMBINES
Filed March 21, 1958
2 Sheets-Sheet 1
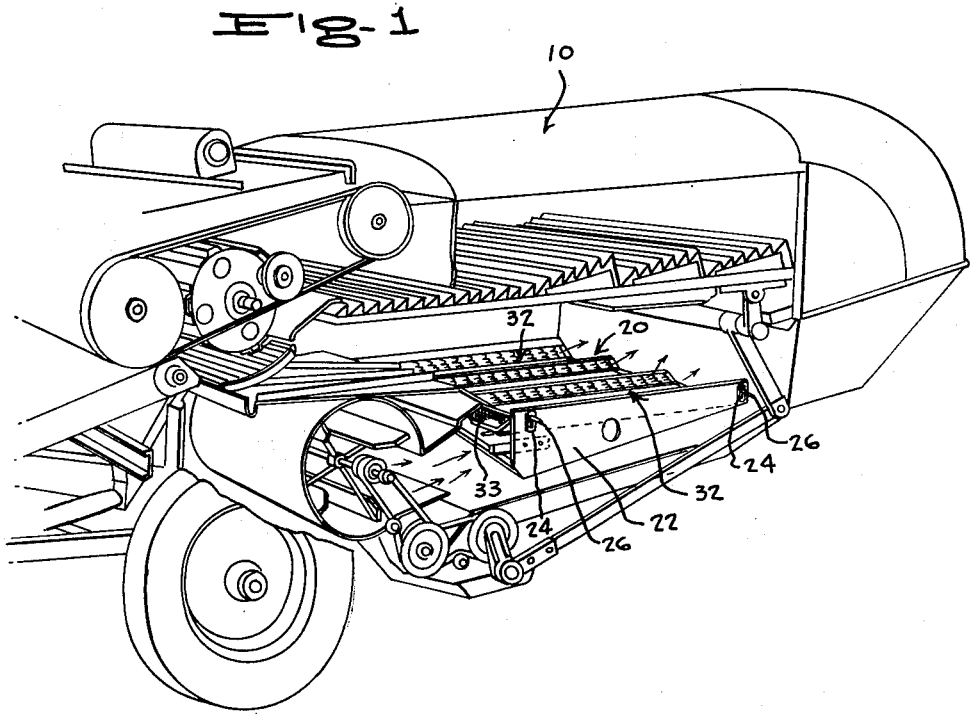
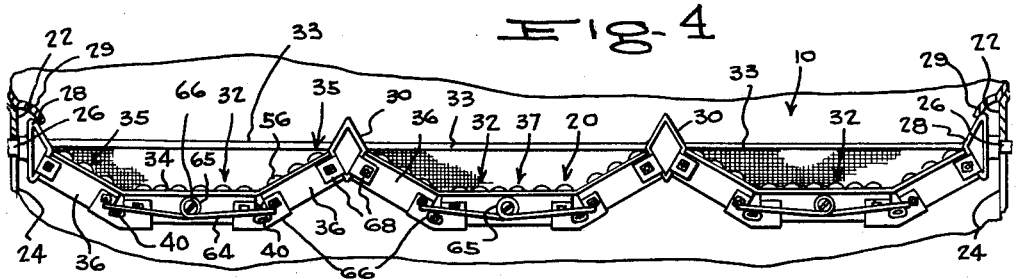
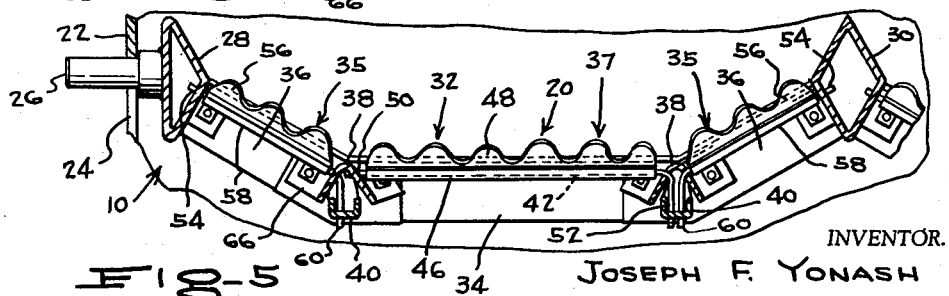
INVENTOR.
JOSEPH F. YONASH
BY
McMorrow, Berman & Davidson
ATTORNEYS

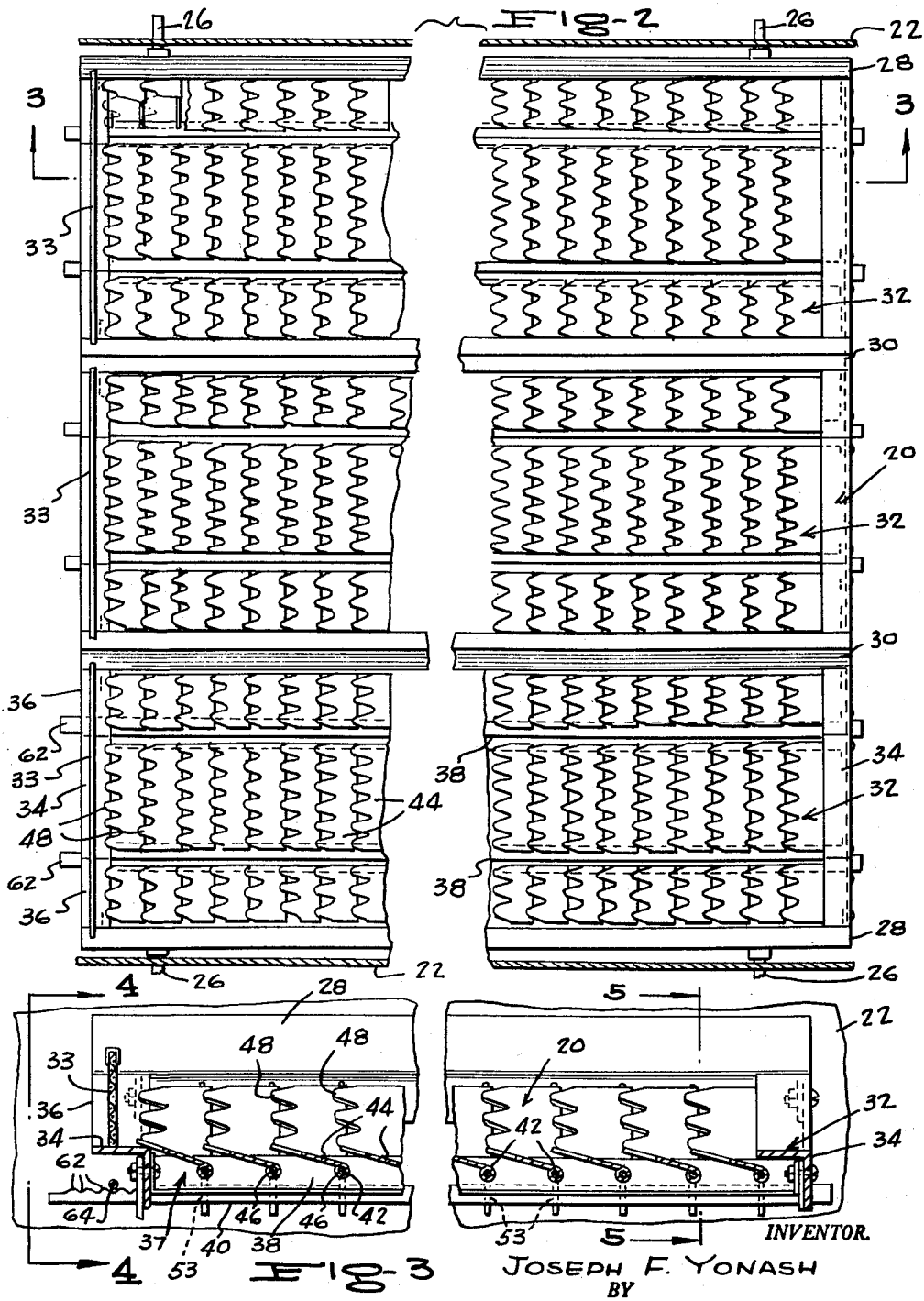

United States Patent Office 2,923,409
Patented Feb. 2, 1960

2,923,409
GRAIN SAVER SIEVE FOR COMBINES
Joseph F. Yonash, Boscobel, Wis.

Application March 21, 1958, Serial No. 722,902

6 Claims. (Cl. 209—394)

This invention relates to sieves for combines, and more particularly has reference to a grain sieve or so-called "chaffer," designed especially for being mounted on a combine as a substitute for the grain sieves conventionally provided thereon.

Combines of modern construction are provided with grain sieves, which are wholly flat. Said sieves are of a self-balancing type, that is, they are intended to remain in a substantially horizontal plane even though the combine should be tilted, as for example during the harvesting of grain on hillsides where contour farming operations are practiced. The purpose of maintaining the sieve in a substantially horizontal position is, of course, to prevent the grain from piling up at one side thereof or from running off the sieve.

However, it has been found that a sieve of a wholly planiform construction such as is in conventional use has the deficiency that the grain runs or works to one side or the other of the sieve, piles up, and slides out along the sides of the sieve, even though the sieve is of the self-balancing type. The main object of the present invention, accordingly, it is to eliminate the deficiencies which have been noted in conventional construction, through the provision of a sieve which will comprise a plurality of like sections each of which is transversely depressed, with the several sections being connected to one another in side-by-side relation, each section including a plurality of fluted or scalloped shutters, mounted for adjustment to selected positions, according to the type of the grain that is passing through the sieve.

A more specific object of the invention is to permit the improved sieve constituting the present invention to be substituted for conventional sieves without requiring any modification or redesign of those components of the combine that are used for mounting or supporting said conventional sieves.

Yet another object is to provide improved joints or connections between the several, like sections of the improved sieve, which will be designed to insure against grain catching thereon, and will be so formed that the grain will readily slide off the connecting elements provided in the invention.

Yet another object of importance is to form the sieve of the invention in such a manner as to permit it to be manufactured at a comparatively low cost, considering the improved structural and functional characteristics thereof as compared to conventional sieves.

Yet another object is to provide a sieve as described that will be formed to provide fasteners that hold the sieve in the combine, which fasteners can be made readily applicable to any make of combine.

Other objects will appear from the following description, the claims appended thereto, and from the annexed drawing, in which like reference characters designate like parts throughout the several views, and wherein:

Figure 1 is a fragmentary perspective view of a combine equipped with a sieve according to the present invention;

Figure 2 is an enlarged horizontal sectional view through the sieve-supporting components of the combine, showing the sieve in top plan, portions being broken away;

Figure 3 is a view on the same scale as Figure 2, taken substantially on line 3—3 of Figure 2;

Figure 4 is a view taken on line 4—4 of Figure 3, showing the sieve in edge elevation, the scale being reduced below that of Figures 2 and 3; and Figure 5 is an enlarged sectional view taken transversely through one of the sieve sections, substantially on line 5—5 of Figure 3.

Referring to the drawing in detail, a conventional combine generally designated 10 is illustrated in Figure 1. It will be understood at this point that this is only one of many makes of combines on which the sieve is readily mountable. The sieve need be modified, to fit a particular make, only in respect to very minor and inconsequential details, as for example the fasteners used to hold the sieve to the associated mounting plates or equivalent means of the combine on which the sieve is to be used.

It is mainly important, for the purposes of the present application, to point out that the sieve of the invention is particularly designed to be subsituted bodily for the conventional, wholly planiform sieve that is provided upon a combine. As a result, no modification or redesign of the sieve-supporting components of the combine is necessary.

The sieve constituting the present invention has been generally designated 20, and extends between vertically disposed support plates 22 provided upon the combine, said support plates being mounted on the combine in the usual manner, to permit self-balancing of the sieve during tiltable positioning of the combine, as for example during the threshing of grain on hillsides where contour farming operations are practiced.

Mounting plates 22, as is usual, are provided at their opposite ends with relatively small, vertically disposed, slot-like apertures 24. In accordance with the present invention, the sieve 20 is provided with outwardly projecting pins 26 loosely positioned within said apertures, thus to support the sieve at its opposite sides upon the plates 22.

Pins 26 are secured to and project outwardly from side rails 28 of isosceles-triangular cross section, disposed in confronting relation adjacent plates 22, as clearly seen from Figure 4.

To close the gap between the sieve and the side pan walls that slope down to the opposite sides of the sieve, there are provided lips or shields 29 (Figure 4). Extending parallel to side rails 28 are upper, main connecting rails 30 of rhomboidal or diamond-shaped cross section, used for connecting to each other, in side-by-side relation, like sieve sections generally designated 32.

Since the sections 32 are all identical, the description of one will suffice for all. Each section 32 is transversely depressed, that is, it includes a horizontally disposed intermediate portion of substantial width, flanked by sloped or inclined side portions, said side portions sloping downwardly toward the opposite sides of the intermediate portion, as clearly seen in Figures 4 and 5.

The intermediate portion of section 32 includes angle iron front and back support bars 34, the angles included between the angularly related portions of one bar facing outwardly of the sieve (see the left hand bar 34 in Figure 3). The angle included between the angularly related portions of the other bar 34 faces inwardly of the sieve (see the right hand bar 34 in Figure 3). This arrangement is so selected that the material passing over and through the sieve will slide off the respective bars 34, since the general direction of travel of the material is from the right in Figure 3. Mounted on the front end of the screen (see Figures 1–4) are screens 33. These let air from the fan cone through, but keep grain from falling off the front end of the sieve.

The respective, sloped side portions of each section 32 have been generally designated 35. Each of these includes front and back support bars 36, also of angle iron material, arranged with their included angles opening in the same direction as the support bars 34 adjacent the same.

The intermediate portions of each sieve section have been generally designated 37, and these are each connected at its opposite sides to the lower sides of the side portions 35 of the same section. To this end, there are provided lower secondary connecting rails 38 each of which is of inverted V-shape in cross section as shown in Figure 5, so that grain will slide freely off the same, and will not have any crevices or cavities in which it can lodge.

Each rail 38 overlies and is in embracing relation to an adjusting rod 40 of upwardly opening, channel-shaped cross section (see Figure 5).

Referring now to Figure 3, a plurality of shutter support rods 42 is provided in the intermediate portion 37, these being extended in parallel relation to the bars 34, and being uniformly spaced apart from front to back of the portion 37. The rods 42, at their opposite ends, are rotatably engaged in openings provided in the respective, adjacent walls of the rails 38. Shutters 44 along one side are rolled as at 46 about the rods 42, and are crimped to or otherwise fixedly secured to the rods for rotation with the rods, so that said shutters extend parallel to the bars 34, and also are pivoted for swinging movement about axes extending along one longitudinal edge of the shutters, this being the edge having the rolled portions 46.

The other, free longitudinal edges of the shutters 44 are scalloped or fluted as at 48, this arrangement being found to be particularly desirable in facilitating the passage of grain of a certain size through the spaces between adjacent shutters.

When the shutters are partially open as in Figure 3, grain can pass through the space between adjacent shutters, to fall downwardly from the sieve, while the chaff is prevented against downward passage from the sieve through said space. The shutters can of course be swung to completely closed positions, and the extent to which they are swung to open positions would be governed by the particular kind of grain being threshed, of course.

Referring to Figure 5, one end 50 of the respective rods 42 is loosely engaged in one rail 38, while each rod 42 at its other end has a depending extension 52 which is loosely engaged at its lower end in an opening 53 provided in the adjusting rod 40 (see Figure 3).

Freely rotatable at one end in openings provided in the rails 28, 30 (see Figure 5) are rods 54 of the side portions 35 of the sieve section 32. As will be understood, the intermediate section 32 shown in Figure 4 would have the rods 54 of the side portions engaged in the respective connecting rails 30. The rods 54 of the inside portion 35 of each side section 32 will also be engaged in rails 30 (see the right hand rods 54 in Figure 5). The rods 54 of the outside portions 35 of the side sections 32 would be engaged in the rail 28 (see the left hand rods 54 in Figure 5).

Secured to rods 54 for rotation therewith are the fluted shutters 56 of the side portions 35, having rolled longitudinal edges 58 corresponding to the edges 46. Rods 54, at the ends thereof adjacent the center portion 37, have depending extensions 60 loosely engaged in openings provided in the respective adjusting rods 40.

Referring to Figure 3, at one end, rods 40 project beyond the adjacent bars 34, and the projecting ends of rods 40 are provided with a plurality of recesses 62. Referring to Figure 4, an elongated spring element 64 has a center convolution or convolutions 65, extending about pins 66 projecting outwardly from the adjacent bar 34. The end portions of the members 64 extend in opposite directions from convolution 65, and overlie the projecting, recessed ends of rods 40, the spring element being tensioned to cause said end portions thereof to bear downwardly against the projecting portions of rods 40, so as to engage firmly but releasably in a selected recess 62 shown in Figure 3.

It will be understood that the rods 40 are freely slidable in the direction of their lengths within openings provided in front and back support bars 34.

By reason of this arrangement, one can adjust all the slats of a particular sieve section 32 by grasping the projecting portions of the rods 40 thereof and shifting the rods in a selected direction. This will cause the several rods 42, 54 to pivot about axes extending longitudinally thereof, thus to swing the shutter to selected positions of adjustment, according to the size and kind of the grain being threshed. Thus, movement of rod 40 shown in Figure 3 to the left in Figure 3 would cause shutters 44 to swing upwardly, thereby to increase the size of the spaces between adjacent shutters. Conversely, movement of rod 40 to the right in Figure 3 would pivot the shutters 44 counterclockwise in Figure 3, to reduce the spaces between adjacent shutters or completely close the shutters, as desired.

In use of the device, the bars 36 are fixedly secured to the bars 34, by means of the connecting rails 38, which have at their ends connector brackets 66 (see Figures 4 and 5). Brackets 66 are rigid with the connecting rails 38 and are in turn bolted to the bars 34, 36.

The rails 30 connecting adjacent sections 32 are provided with brackets 68, and these are fixed to the rails 30, after which they are bolted to the adjacent bars 36 of the respective, side-by-side sieve sections 32.

The sieve can of course be substituted for a wholly conventional sieve, without any modification or redesign of the adjacent, sieve-supporting components of the combine. The construction thus permits use of the device on combines that are already in use, although of course the sieve could be incorporated in a combine during manufacture of the combine.

The sieve has the desirable characteristic of holding the grain against sliding off one or the other side of the sieve, that is, sliding off the sieve in a direction to the right or to the left in Figure 4. Further, piling up of the grain at one side or the other of the sieve is completely eliminated, and the grain in effect is divided into separate quantities, each supported upon a different section 32, the quantity of grain on each section being held, by reason of the depressed formation of the section, against movement therefrom onto an adjacent section. This prevents excessive piling of the grain on any one section, and thereby facilitates the separation of the grain from the chaff. As will be understood, the operation of a combine is such that a current of air is directed upwardly from the fan, passing upwardly through the sieve so that lighter materials, such as the chaff or other waste, is blown upwardly off the sieve. Heavier material, such as the grain, is not caught up in the air current, and gravitates through the spaces between adjacent shutters of the sieve.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. A sieve for combines comprising a plurality of sieve sections connected side-by-side to form a continuous sieving surface, each section including a substantially horizontal intermediate portion and a pair of side portions flanking the intermediate portion and sloping downwardly from opposite sides of the section toward the intermediate portion, each portion including a plurality of spaced shutters mounted for adjustment to selected positions in respect to one another for correspondingly adjusting the size of the spaces therebetween; and means carried by each section connecting all the shutters of each portion for conjoint adjustment, comprising rotatably supported rods extending from the several shutters of each portion, and at least one adjusting rod mounted in each sieve section for sliding movement in the direction of its length and having a loose connection to the several first named rods effective to translate sliding movement of the adjusting rod into rotary movement of the first named rods and shutters, said adjusting rod having a plurality of longitudinally spaced recesses, said means for connecting the shutters of each portion for conjoint adjustment further including spring means carried by each section in position to releasably engage in a selected recess of the adjusting rod.

2. A sieve for combines comprising a plurality of sieve sections connected side-by-side to form a continuous sieving surface, each section including a substantially horizontal intermediate portion and a pair of side portions flanking the intermediate portion and sloping downwardly from opposite sides of the section toward the intermediate portion, each portion including a plurality of spaced shutters mounted for adjustment to selected positions in respect to one another for correspondingly adjusting the size of the spaces therebetween; and means carried by each section connecting all the shutters of each portion for conjoint adjustment, comprising rotatably supported rods extending from the several shutters of each portion and connected to said shutters for conjoint rotation therewith, a pair of adjusting rods slidably mounted in each section for movement in the direction of their lengths, said adjusting rods being extended along opposite sides of the intermediate portion of each section, one of the adjusting rods having a loose connection to the several first named rods of one side portion of the section, the other adjusting rod having a loose connection to the several first named rods of the intermediate portion and of the other side portion of the same section, whereby on sliding movement of the adjusting rods, the several first named rods of a section will be rotated conjointly with their associated shutters for adjusting the positions of the shutters relative to one another, and spring means carried by the intermediate portion bearing against the adjusting rods in each position to which the adjusting rods are slidably moved, for releasably holding the adjusting rods in selected positions to which they are so moved.

3. A sieve for combines comprising a plurality of sieve sections connected side-by-side to form a continuous sieving surface, each section including a substantially horizontal intermediate portion and a pair of side portions flanking the intermediate portion and sloping downwardly from opposite sides of the section toward the intermediate portion, each portion including a plurality of spaced shutters mounted for adjustment to selected positions in respect to one another for correspondingly adjusting the size of the spaces therebetween; and means carried by each section connecting all the shutters of each portion for conjoint adjustment, comprising rotatably supported rods extending from the several shutters of each portion and connected to said shutters for conjoint rotation therewith, a pair of adjusting rods slidably mounted in each section for movement in the direction of their lengths, said adjusting rods being extended along opposite sides of the intermediate portion of each section, one of the adjusting rods having a loose connection to the several first named rods of one side portion of the section, the other adjusting rod having a loose connection to the several first named rods of the intermediate portion and of the other side portion of the same section, whereby on sliding movement of the adjusting rods, the several first named rods of a section will be rotated conjointly with their associated shutters for adjusting the positions of the shutters relative to one another, and spring means carried by the intermediate portion bearing against the adjusting rods in each position to which the adjusting rods are slidably moved, for releasably holding the adjusting rods in selected positions to which they are so moved, said spring means comprising an elongated length of spring wire having intermediate its ends a coil pivoted upon the intermediate portion of the section, said wire having end portions tensioned to bear against the respective adjusting rods, the adjusting rods having recesses in which said end portions are engageable in each position to which the adjusting rods are shifted.

4. A sieve for combines comprising a pair of spaced side rails; a plurality of spaced upper connecting rails disposed between the side rails in parallel relation thereto to divide the space between the side rails into a plurality of smaller spaces; a plurality of like sieve sections suspended from the several rails, each in one of the smaller spaces, each section including a pair of secondary connecting rails paralleling the main connecting rails and subdividing each smaller space into three side-by-side areas, a generally horizontal intermediate portion and a pair of side portions occupying the respective areas, said side portions flanking the intermediate portion and sloping downwardly from opposite sides of the section toward the intermediate portion, each portion including front and back support bars fixedly connected between adjacent rails, a plurality of spaced shutters extending between said adjacent rails in parallel relation to the front and back support bars, a plurality of rods each of which is secured to a shutter, said rods being journaled at their ends in and being extended between said adjacent rails, and a pair of adjusting rods slidably mounted in each section at opposite sides of said intermediate portion below the respective secondary connecting rails, one of the adjusting rods having a loose connection to the several first-named rods of one side portion of the section, the other adjusting rod having a loose connection to the several first-named rods of the intermediate portion and of the other side portion of the same section, whereby on sliding movement of the adjusting rods, the several first-named rods of a section will be rotated conjointly with their associated shutters for adjusting the positions of the shutters relative to one another, and spring means carried by the intermediate portion bearing against the adjusting rods in each position to which said adjusting rods are slidably moved, for releasably holding the adjusting rods in selected positions to which they are so moved, said spring means being mounted upon one of the support bars of the intermediate portion.

5. A sieve as in claim 4 wherein the secondary connecting rails are of angular cross section and open downwardly to define below the same covered spaces in which the respective adjusting rods are disposed.

6. A sieve as in claim 5 wherein each of the angularly related walls of a secondary connecting rail is formed with a longitudinal series of apertures providing journals for the first-named rods, the first-named rods including depending extensions within the covered spaces, with the adjusting rods having openings into which the extensions project to effect the loose connection of the first-named rods to the adjusting rods.

References Cited in the file of this patent

UNITED STATES PATENTS

| | | |
|---|---|---|
| 665,332 | Lippy et al. | Jan. 1, 1901 |
| 721,940 | Closz | Mar. 3, 1903 |
| 1,448,725 | Campbell | Mar. 20, 1923 |
| 2,617,425 | Dion | Nov. 11, 1952 |
| 2,739,597 | Buttars | Mar. 27, 1956 |